Nov. 6, 1923.
A. R. WEBB
1,473,266
FOOD AND WATER TROUGH FOR POULTRY
Filed Nov. 8, 1922    2 Sheets-Sheet 2
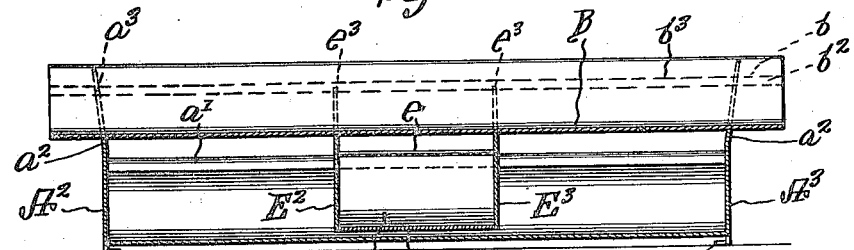
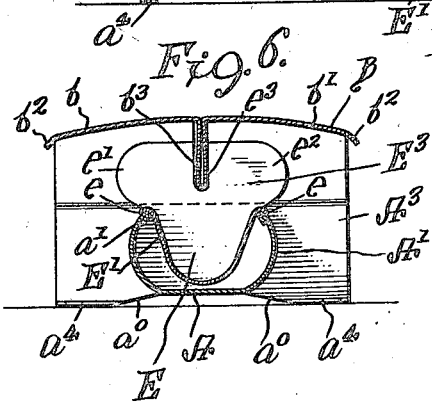
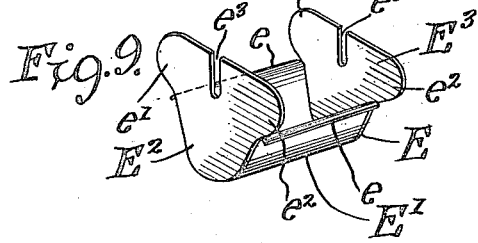
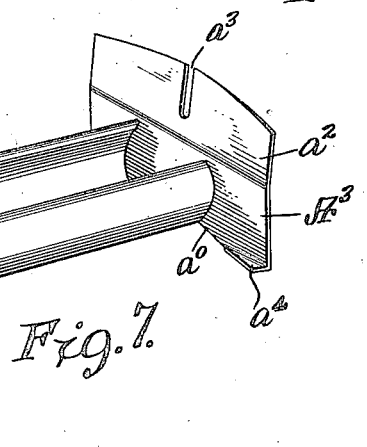
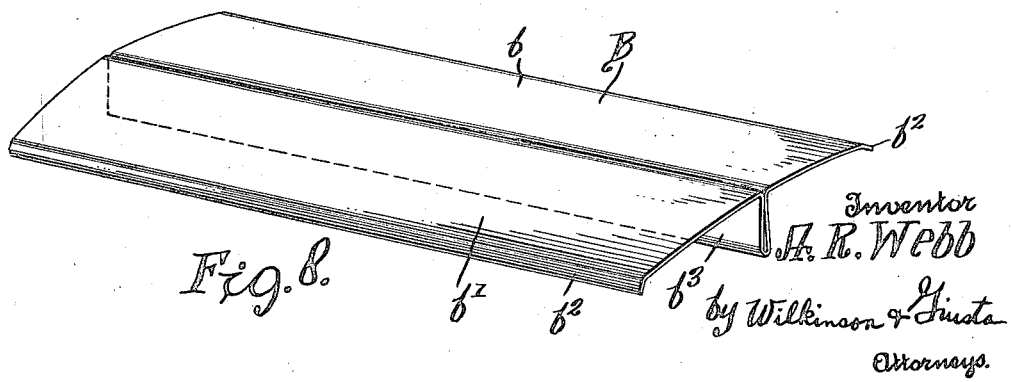
Inventor
A. R. Webb
by Wilkinson & Fiusta
Attorneys.

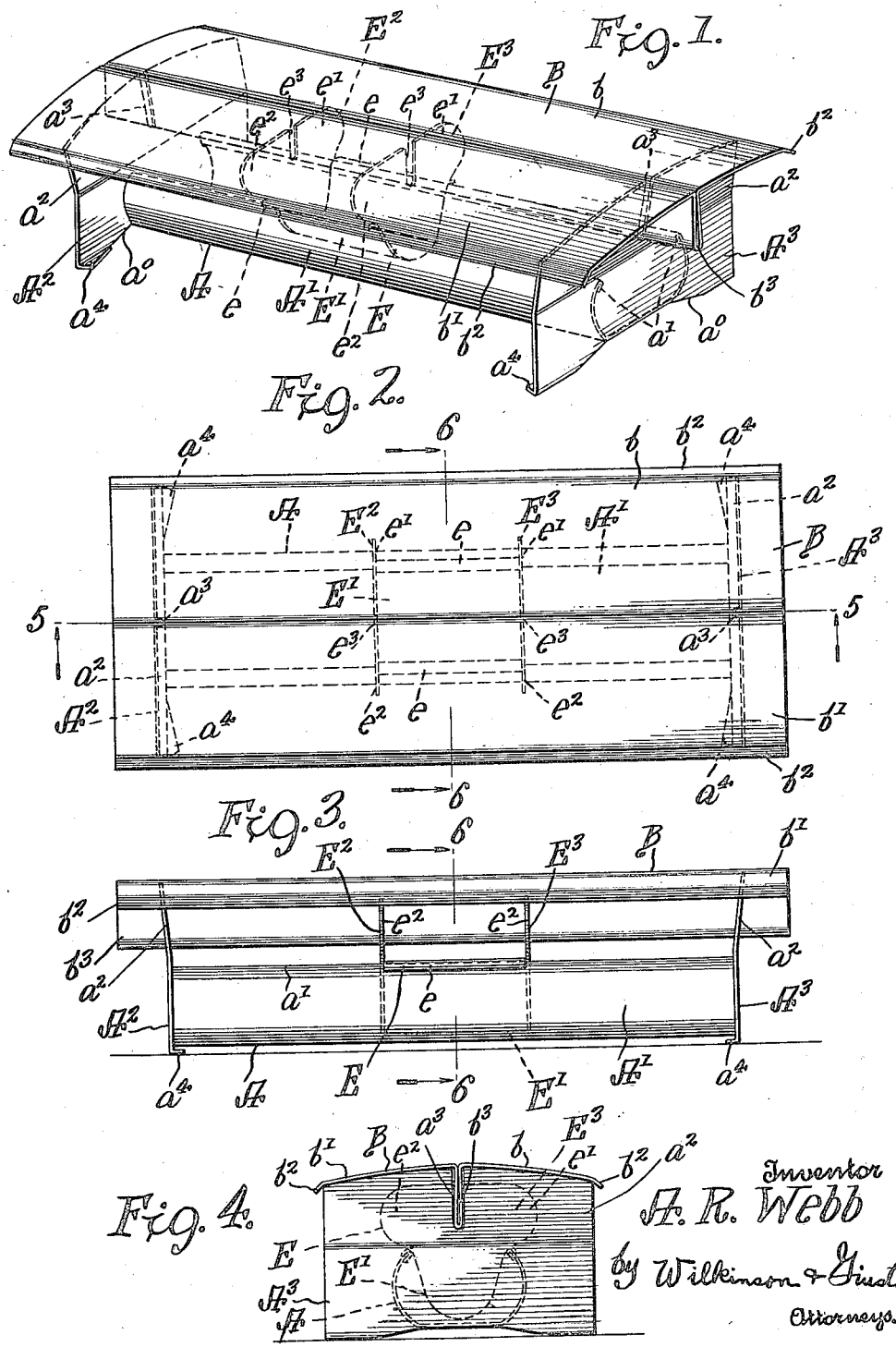

Patented Nov. 6, 1923.

1,473,266

UNITED STATES PATENT OFFICE.

ARCHIE R. WEBB, OF PENSACOLA, FLORIDA.

FOOD AND WATER TROUGH FOR POULTRY.

Application filed November 8, 1922. Serial No. 599,683.

*To all whom it may concern:*

Be it known that I, ARCHIE R. WEBB, a citizen of the United States, residing at Pensacola, in the county of Escambia and State of Florida, have invented certain new and useful Improvements in Food and Water Troughs for Poultry, of which the following is a specification.

My invention relates to an improved food and water trough for use with poultry, and it is intended to provide a trough which will conserve the food, keep the food and water separated, without danger of the two becoming mixed, and which will keep the food dry and protect it from rain and substantially from dust or dirt or foreign matter, and will also keep the water in the shade and not exposed to the sun's rays; therefore rendering it possible to keep it more palatable to the poultry.

The invention is also intended to provide a cheap, simple and efficient apparatus which may be cheaply constructed, readily assembled and readily taken apart for cleansing or refilling if desired.

My invention will be more clearly understood after reference to the accompanying drawings, in which like parts are indicated by similar reference symbols throughout the several views, and in which:—

Figure 1 is a perspective view of the complete apparatus showing all the parts assembled and in the proper relation.

Figure 2 is a plan view of the device shown in Figure 1.

Figure 3 is a side elevation of the device shown in Figs. 1 and 2.

Figure 4 is an end view of the device shown in Figs. 1, 2 and 3.

Figure 5 shows a section along the line 5—5 of Fig. 2, and looking in the direction of the arrows.

Figure 6 shows a section along the line 6—6 of Figs. 2 and 3, and looking in the direction of the arrows.

Figure 7 is a perspective view of the body portion, including the food trough.

Figure 8 is a perspective view of the roof detached; and

Figure 9 is a perspective view of the water trough which may be mounted in the food trough under the roof.

The device consists primarily of three separate parts—the body portion A comprising the food trough and the projecting and supporting ends therefor; the roof B mounted over the same; and the water trough E which is slidably mounted in the food trough and is detachable therefrom, and holds the water separate from the food.

Referring to the details of construction, the body portion A is preferably made of a single blank sheet of metal which is cut along the lines $a^0$—$a^0$, see Fig. 7, and bent into the shape shown in said figure, in which A' represents the food trough having the beaded edges $a'$.

$A^2$ and $A^3$ represent the two end portions of the blank which are bent up and soldered or otherwise secured to the trough portion to form a tight joint. The upper part of these end portions is preferably flared outwards, as at $a^2$, and provided with a central vertical notch $a^3$. The lower part of these end portions is flanged inwards to form supporting feet $a^4$, so that the weight of the body portion will be better distributed over the ground or other platform, and the trough will remain normally in the level position.

The cover B is also preferably made of a single piece of sheet metal, having the laterally disposed flanges $b$ and $b'$, sloping downwards slightly and terminating in the downwardly inclined edges $b^2$. The central portion of this sheet is doubled upon itself to form a web $b^3$ which is adapted to engage in the notches $a^3$ in the ends of the body portion A. The cover and the body portion may be used alone to form a single food trough, but I preferably enclose under the same roof a water trough E, such as is shown in detail in Fig. 9.

The construction shown comprises a strip of metal bent to form a V-shaped trough E' having curved edges $e$ projecting laterally to rest on the beaded edges $a'$ of the food trough A'. The ends of this trough E' are closed with end pieces $E^2$ and $E^3$ which are preferably provided with outwardly projecting ears $e'$ and $e^2$ to prevent spattering of water from the water trough into the food trough, or the scattering of food from the food trough into the water trough. These end pieces $E^2$ and $E^3$ are also notched, as at $e^3$, to engage the web $b^3$ of the roof B' so that when the parts are in the assembled relation this web $b^3$ serves to hold the roof against displacement on the trough, and also serves to steady the water trough in the desired position.

It will be seen that the water trough may be moved anywhere along the food trough so as to form two compartments in the food trough which may be of the same or different dimensions as desired. Thus different food may be placed in different sides of the trough, or different articles, such as limy particles at one side of the water trough and the food at the other side.

It will be seen that when the parts are assembled the contents of the food trough will be protected from normal rainfall and from the normal effects of the elements, such as the blowing about of dead leaves, dust, or the like. Thus the food will not get soaked in the rain, or tend to become sour, nor will it become foul from foreign matter blown into it. Again the water in the water trough will be protected by the roof and will be kept comparatively cool.

It will be seen that the device may be completely disassembled by simply taking off the roof and taking out the water trough, when all of the parts may be very conveniently separately cleansed and recharged as desired. The parts being all of metal may be thoroughly cleansed by hot water, or may be sterilized over a fire if desired, and there is no likelihood of infection from the absorption of liquids as would occur with wooden receptacles.

In assembling the parts the water trough is put in position and filled with water to the desired level, the food trough is charged and the roof put on.

It will be noted that the web $b^3$ forms a central partition located above the food trough, and thus prevents poultry on one side from attacking poultry on the other side, and at the same time furnishes a double service counter for food and water.

It will be seen that the device will be very light and durable and can be conveniently transported from place to place, and left out in all sorts of weather without injury, and also that if the water should freeze up in the water trough no damage would be done.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. An all metal arrangement for feeding poultry comprising a body portion made of sheet metal and provided with a central food trough, upwardly and downwardly projecting plates notched at the top, and bent at the bottom to form supporting legs, and a detachable roof portion made of a metal plate bent downwards at its axial center to form a web engaging in said notches in said plates, the said roof having downwardly inclined parts projecting laterally above and beyond the sides of said food trough.

2. An all metal arrangement for feeding poultry comprising a body portion made of sheet metal and provided with a central food trough with supporting legs, and upwardly projecting notched end plates, and a detachable roof portion made of a metal plate bent downwards at its axial center to form a web engaging in said notches in said end plates, the said roof having downwardly inclined parts projecting laterally above and beyond the sides of said food trough.

3. An all metal arrangement for feeding poultry comprising a body portion made of sheet metal and provided with a central food trough, upwardly and downwardly projecting plates notched at the top, and bent at the bottom to form supporting legs, and a detachable roof portion made of a metal plate bent downwards at its axial center to form a web engaging in said notches in said end plates, the said roof having downwardly inclined parts projecting laterally above and beyond the sides of said food trough, with a water trough slidably mounted in said food trough and also provided with upwardly projecting notched end plates adapted to engage the web on said roof portion.

4. An all metal arrangement for feeding poultry comprising a body portion made of sheet metal and provided with a central food trough with supporting legs, and upwardly projecting notched end plates, and a detachable roof portion made of a metal plate bent downwards at its axial center to form a web engaging in said notches in said end plates, the said roof having downwardly inclined parts projecting laterally above and beyond the sides of said food trough, with a water trough slidably mounted in said food trough, and also provided with upwardly projecting notched end plates adapted to engage the web on said roof portion.

5. An all metal arrangement for feeding poultry comprising a body portion made of sheet metal and provided with a central food trough with supporting legs, and upwardly projecting end plates, and a detachable roof portion made of a single metal plate bent downwards at its axial center to form a longitudinal web, the said roof having downwardly inclined parts projecting laterally above and beyond the sides of said food trough.

6. An all metal arrangement for feeding poultry comprising a body portion made of sheet metal and provided with a central food trough with supporting legs, and upwardly projecting end plates, and a detachable roof portion made of a single metal plate bent downwards at its axial center to form a longitudinal web, the said roof having downwardly inclined parts projecting laterally above and beyond the sides of said food trough, with a water trough slidably mounted in said food trough and having projecting sides resting on the edges of said food trough.

7. An all metal arrangement for feeding poultry comprising a body portion made of sheet metal and provided with a central food trough, upwardly projecting notched end plates, and a detachable roof portion made of sheet metal plate provided at its axial center with a downwardly projecting web engaging in said notches in said end plates, the said roof having downwardly inclined parts projecting laterally above and beyond the sides of said food trough.

8. An all metal arrangement for feeding poultry comprising a body portion made of sheet metal and provided with a central food trough, upwardly projecting notched end plates, and a detachable roof portion made of sheet metal plate provided at its axial center with a downwardly projecting web engaging in said notches in said end plates, the said roof having downwardly inclined parts projecting laterally above and beyond the sides of said food trough, with a water trough slidably mounted in said food trough, and also provided with upwardly projecting notched end plates adapted to engage the web on said roof portion.

9. An all metal arrangement for feeding poultry comprising a body portion made of sheet metal and provided with a central food trough, upwardly projecting notched end plates, and a detachable roof portion made of sheet metal plate provided at its axial center with a downwardly projecting web engaging in said notches in said end plates, the said roof having downwardly inclined parts projecting laterally above and beyond the sides of said food trough, with a water trough slidably mounted in said food trough and having projecting sides resting on the edges of said food trough.

ARCHIE R. WEBB.